United States Patent
Fulkerson et al.

(10) Patent No.: US 10,303,373 B2
(45) Date of Patent: May 28, 2019

(54) PRIORITIZING COMMANDS IN A DATA STORAGE DEVICE

(71) Applicant: Seagate Technology LLC, Cupertino, CA (US)

(72) Inventors: Christopher Fulkerson, Longmont, CO (US); Kenneth Barham, Longmont, CO (US); LingZhi Yang, Longmont, CO (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 15/620,124

(22) Filed: Jun. 12, 2017

(65) Prior Publication Data

US 2018/0356995 A1 Dec. 13, 2018

(51) Int. Cl.
*G06F 13/40* (2006.01)
*G06F 3/06* (2006.01)

(52) U.S. Cl.
CPC ............ *G06F 3/0611* (2013.01); *G06F 3/065* (2013.01); *G06F 3/0659* (2013.01); *G06F 3/0685* (2013.01)

(58) Field of Classification Search
CPC ....... G06F 3/065; G06F 3/0659; G06F 3/0685
USPC .................................. 710/240–244
See application file for complete search history.

(56) References Cited

U.S. PATENT DOCUMENTS

| | | | |
|---|---|---|---|
| 5,260,935 A * | 11/1993 | Turner | H04L 49/30 370/394 |
| 5,548,795 A | 8/1996 | Au | |
| 5,570,332 A * | 10/1996 | Heath | G06F 3/0601 360/78.04 |
| 5,778,200 A * | 7/1998 | Gulick | G06F 13/364 710/113 |
| 5,854,941 A * | 12/1998 | Ballard | G06F 3/061 710/5 |
| 5,933,840 A * | 8/1999 | Menon | G06F 3/0607 |
| 6,009,275 A * | 12/1999 | DeKoning | G06F 9/5011 710/113 |
| 6,170,042 B1 | 1/2001 | Gaertner et al. | |
| 6,301,639 B1 | 10/2001 | Cleavinger et al. | |
| 6,553,454 B1 | 4/2003 | Harada | |
| 6,571,298 B1 | 5/2003 | Megiddo | |
| 6,574,676 B1 * | 6/2003 | Megiddo | G06F 3/0601 710/5 |
| 6,594,742 B1 * | 7/2003 | Ezra | G06F 12/123 711/133 |
| 6,631,433 B1 * | 10/2003 | Paluzzi | G06F 13/364 710/113 |
| 6,640,258 B2 | 10/2003 | Espeseth et al. | |
| 7,043,567 B2 | 5/2006 | Trantham | |

(Continued)

*Primary Examiner* — Paul R. Myers
(74) *Attorney, Agent, or Firm* — Westman, Champlin & Koehler, P.A.

(57) ABSTRACT

An apparatus includes a buffer and a processor. The buffer contains a plurality of commands pending for a data storage medium. The processor is configured to sort the commands in an execution efficiency favorable manner, which reveals a most favorable command for execution, compare a skip count for each of the commands to a threshold count, the skip count corresponding to a number of times execution of the command has been skipped in favor of execution of another command, and execute one of the commands having a skip count that has reached the threshold count over the execution of the most favorable command.

17 Claims, 4 Drawing Sheets

(56) References Cited

U.S. PATENT DOCUMENTS

| | | | |
|---|---|---|---|
| 7,114,029 B1 | 9/2006 | Thelin | |
| 7,155,573 B1 * | 12/2006 | Levin-Michael | G06F 12/123 711/133 |
| 7,310,707 B2 * | 12/2007 | Olds | G06F 12/0804 710/56 |
| 8,327,093 B2 | 12/2012 | Olds et al. | |
| 9,037,767 B1 * | 5/2015 | Chowdhuri | H04L 47/20 710/107 |
| 9,075,538 B2 | 7/2015 | Fulkerson et al. | |
| 9,098,203 B1 * | 8/2015 | Kedem | G06F 3/061 |
| 9,747,222 B1 * | 8/2017 | Armangau | G06F 12/124 |
| 2002/0091882 A1 * | 7/2002 | Espeseth | G06F 3/061 710/6 |
| 2003/0056034 A1 | 3/2003 | Olds et al. | |
| 2004/0024971 A1 * | 2/2004 | Bogin | G06F 12/0804 711/135 |
| 2004/0230746 A1 * | 11/2004 | Olds | G06F 12/0804 711/133 |
| 2005/0055517 A1 | 3/2005 | Olds et al. | |
| 2014/0379940 A1 | 12/2014 | Fulkerson et al. | |
| 2015/0160887 A1 | 6/2015 | Beeson et al. | |

* cited by examiner

*400A*

| | | — *406* |
|---|---|---|
| COMMAND 402S | 13 | |
| COMMAND 402G | 8 | — *406* |
| COMMAND 402M | 11 | — *406* |
| COMMAND 402E | 4 | — *406* |
| COMMAND 402X | 2 | — *406* |
| COMMAND 402H | 20 | — *406* |
| ⋮ | ⋮ | |

| | | — *406* |
|---|---|---|
| *412* ← COMMAND 402E | 4 | |
| COMMAND 402B | 12 | — *406* |
| COMMAND 402X | 2 | — *406* |
| COMMAND 402G | 8 | — *406* |
| *414* ← COMMAND 402H | 20 | — *406* |
| COMMAND 402S | 13 | — *406* |
| ⋮ | ⋮ | |

*FIG. 4B*

PRIORITIZING COMMANDS IN A DATA STORAGE DEVICE

BACKGROUND

Data storage devices, such as disc drives, are used to store digital data through write commands and retrieve digital data through read commands. It is desired that such read and write commands be executed in an efficient manner to provide good performance.

SUMMARY

Embodiments of the present disclosure generally relate to systems and methods for prioritizing commands in a data storage system for execution. The systems and methods sort received commands to optimize performance while limiting command execution latency.

One embodiment of the apparatus includes a buffer and a processor. The buffer contains a plurality of commands pending for a data storage medium. The processor is configured to sort the commands in an execution efficiency favorable manner, which reveals a most favorable command for execution. The processor is also configured to compare a skip count for each of the commands to a threshold count. The skip count corresponds to a number of times execution of the command has been skipped in favor of execution of another command. Additionally, the processor is configured to execute one of the commands having a skip count that has reached the threshold count over the execution of the most favorable command.

In one embodiment of the method, commands are stored in a queue. The commands are sorted based on an efficiency at which the commands can be executed, which reveals a most favorable command for execution. A skip count for each of the commands is compared to a threshold count. The skip count corresponds to a number of times execution of the command has been skipped in favor of execution of another command. One of the commands having a skip count that has reached the threshold count is executed over the execution of the most favorable command.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

FIGS. 4A-B illustrate an exemplary queue in accordance with embodiments of the present disclosure during various stages of the method of FIG. 3.

DETAILED DESCRIPTION OF ILLUSTRATIVE EMBODIMENTS

Figure 1:
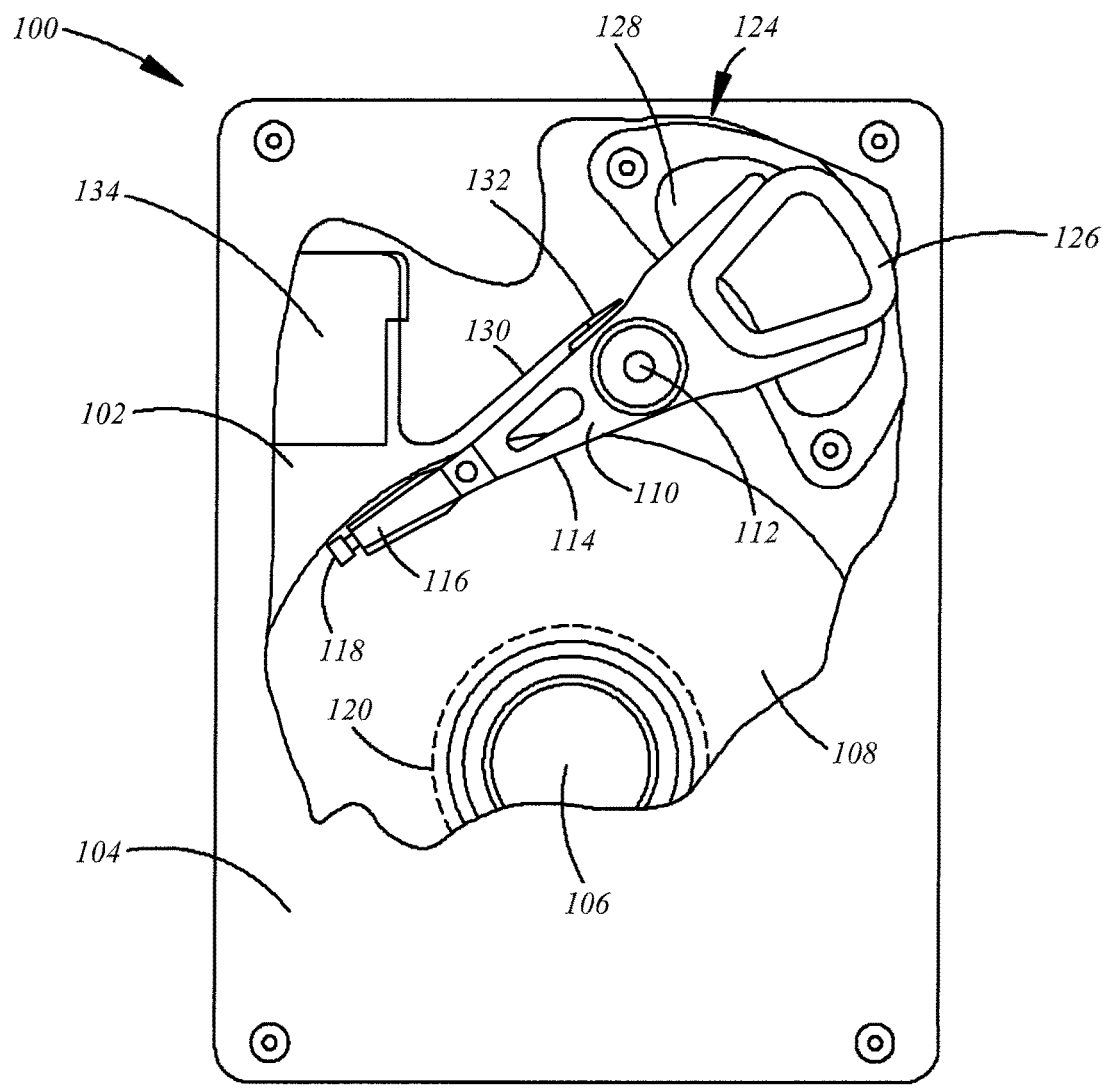
FIG. 1 is a top view of an exemplary disc drive, in which embodiments of the present disclosure may be implemented.

Embodiments of the present disclosure are described more fully hereinafter with reference to the accompanying drawings. Elements that are identified using the same or similar reference characters refer to the same or similar elements. The various embodiments of the present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art.

Many data storage devices use microprocessors to execute commands. Typically, a data storage device can accommodate multiple microprocessor commands. For example, the microprocessor in a disc drive device may receive multiple commands to read or write data from or to media within the disc drive. When commands are received in a data storage device faster than the commands can be executed, the commands are typically buffered to await their turn for processing by the microprocessor in the data storage device. Additionally, data associated with a write command is typically held in a cache memory until the associated command is processed.

Performance in a data storage device can often be improved by executing the received commands in an order different from the order they were originally received. Ordering the commands in this manner is called command reordering. Command reordering allows for a more efficient use of the microprocessor as well as a more efficient use of the hardware being controlled by the microprocessor. For instance, a disc drive may receive commands to read and/or write data at a variety of locations on the hard discs within the disc drive. Ideally, these commands would be processed in a manner that would optimize user perceived performance.

There are a number of ways to order the commands in a command queue. Traditionally, disc drives have employed algorithms to sort commands in an order that focuses on selecting the command for processing having the shortest access time. The access time for each command may include a seek time and a rotational latency time. The seek time is the time required for the read/write element to radially move across or traverse cylinders between a current cylinder over which the read/write element is positioned and a target cylinder to be addressed in response to a particular command. The rotational latency time is the time the disc drive spends waiting for the appropriate data to rotate under the read/write element. Often, the rotational latency time is the dominant component of the total access time for relatively short seeks. As such, many current command ordering algorithms are optimized to reduce rotational latency, either alone or in conjunction with some form of seek time minimization.

Additionally, conventional command queuing techniques may operate to limit the latency at which a command within the queue is executed by overriding the order of the command queue based on a duration at which a command remains unexecuted within the queue. That is, each of the commands in the queue are set to be executed prior to or around a predefined time period. However, such age limits may adversely affect the performance of the disc drive.

For example, when read and/or write operations of the disc drive are interrupted or interfered with, such as when the disc drive is subjected to vibration, or when the disc drive executes a background task (e.g., calibration), aging limits placed on each of the queued commands may all be exceeded. In such a case, the disc drive will operate to execute the oldest commands first without regard to the efficiency at which other commands in the queue may be executed. As a result, aging limits placed on the commands within the queue may inadvertently cause the disc drive to operate in an inefficient first-in-first-out mode for an extended period of time, depending on the set age limits and the size of the queue.

Embodiments of the present disclosure generally relate to systems and methods for prioritizing commands in a data storage system for execution. The systems and methods utilize one or more queues to receive and sort the commands to optimize performance while limiting command execution latency. Furthermore, embodiments of the systems and methods of the present disclosure avoid the above-identified problem with aging limits placed on queued commands.

FIG. 1 is a top view of an exemplary disc drive 100, in which embodiments of the present disclosure may be implemented. The disc drive 100 includes a base 102 to which various components of the disc drive 100 are mounted. A top cover 104, shown partially cut away, cooperates with the base 102 to form an internal, sealed environment for the disc drive in a conventional manner. The components include a spindle motor 106 that rotates one or more discs 108 at a constant high speed. Information is written to and read from tracks on the discs 108 through the use of an actuator assembly 110, which rotates during a seek operation about a bearing shaft assembly 112 positioned adjacent the discs 108. The actuator assembly 110 includes a plurality of actuator arms 114 that extend toward the discs 108, with one or more flexures 116 extending from each of the actuator arms 114. Mounted at the distal end of each of the flexures 116 is a head 118 that includes an air bearing slider enabling the head 118 to fly in close proximity above the corresponding surface of the associated disc 108.

During a seek operation, the track position of the heads 118 may be controlled through the use of a voice coil motor (VCM) 124, which typically includes a coil 126 attached to the actuator assembly 110, as well as one or more permanent magnets 128 that establish a magnetic field in which the coil 126 is immersed. The controlled application of current to the coil 126 causes magnetic interaction between the permanent magnets 128 and the coil 126 so that the coil 126 moves in accordance with the well-known Lorentz relationship. As the coil 126 moves, the actuator assembly 110 pivots about the bearing shaft assembly 112, and the heads 118 are caused to move across the surfaces of the discs 108. The heads 118 are positioned over one or more tracks 120 containing data and servo information for controlling the position of the heads 118.

A flex assembly 130 provides the requisite electrical connection paths for the actuator assembly 110, while allowing pivotal movement of the actuator assembly 110 during operation. The flex assembly may include a printed circuit board 132 to which head wires (not shown) are connected; the head wires being routed along the actuator arms 114 and the flexures 116 to the heads 118. The printed circuit board 132 typically includes circuitry for controlling the write currents applied to the heads 118 during a write operation and a preamplifier for amplifying read signals generated by the heads 118 during a read operation. The flex assembly terminates at a flex bracket 134 for communication through the base deck 102 to a disc drive printed circuit board (not shown) mounted to the bottom side of the disc drive 100.

Figure 2:
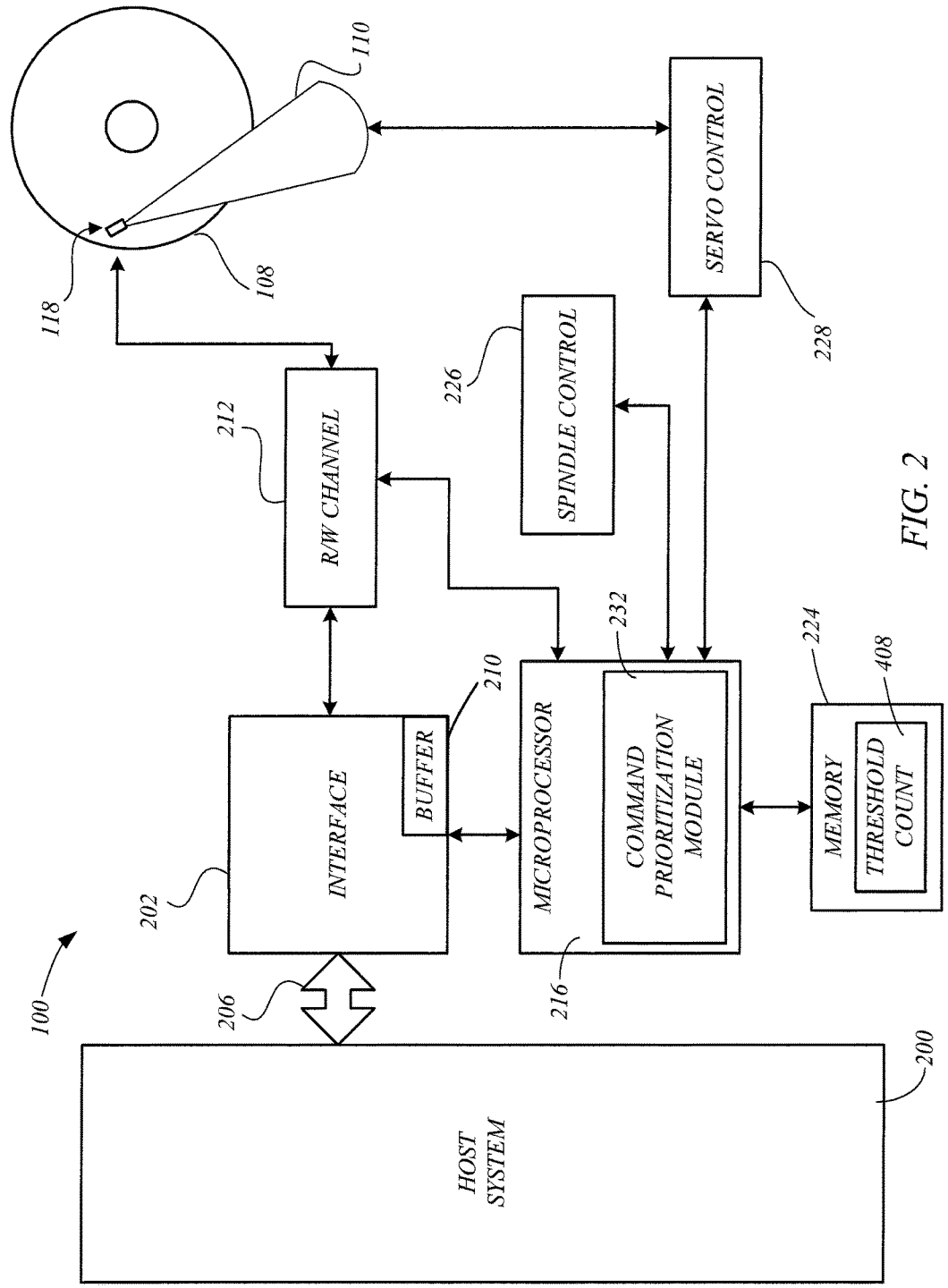
FIG. 2 is an exemplary functional block diagram of the exemplary disc drive of FIG. 1, in accordance with embodiments of the present disclosure.

FIG. 2 is a functional block diagram of the exemplary disc drive 100 of FIG. 1, and generally shows the main functional circuits that may be resident on a disc drive printed circuit board for controlling the operation of the disc drive 100. As shown in FIG. 2, a host computer 200 may be operably connected (206) to an interface application specific integrated circuit (interface) 202. The interface 202 typically includes an associated buffer 210 that facilitates high speed data transfer between the host computer 200 and the disc drive 100.

The buffer 210 is a cache memory for caching commands and/or data to reduce disc access time, and include volatile and non-volatile memory. Data to be written to the disc drive 100 are passed from the host computer to the interface 202 and then to a read/write channel 212, which encodes and serializes the data and provides the requisite write current signals to the heads 118. To retrieve data that has been previously stored by the disc drive 100, read signals are generated by the heads 118 and provided to the read/write channel 212, which performs decoding, error detection and correction operations, and outputs the retrieved data to the interface 202 for subsequent transfer to the host computer 100.

As also shown in FIG. 2, a microprocessor 216 is operably connected to the interface 202. The microprocessor 216 provides top level communication and control for the disc drive 100 in conjunction with programming for the microprocessor 216, which may be stored in a non-volatile memory 224 that is accessible by the microprocessor 216. The memory 224 may include random access memory (RAM), read only memory (ROM), and/or other sources of resident memory for the microprocessor 216. Additionally, the microprocessor 216 provides control signals for spindle control 226 and servo control 228. The embodiment illustrated in FIG. 2 includes a command prioritization module 232 being executed by the microprocessor 216. The module 232 may be executable code initially resident in the memory 224 and read and executed by the microprocessor 216 to perform unique operations to prioritize commands giving preference to pending commands.

In operation, the host computer 200 sends commands to the disc drive 100 instructing the disc drive 100 to read or write data from or to the discs 108. A "write" command typically includes data to be written to the discs 108 along with a logical address indicating where the data is to be written and the number of bytes to write. A "read" command typically includes a logical address indicating the location or locations of data to be read, and a size indicator indicating the number of bytes to be read. The commands are received by the interface 202, where they may be processed immediately or stored for later processing. The interface 202 may store the commands and their associated data and/or addresses so that the commands can be sorted, ordered, or prioritized in such a way that disc drive 100 performance may be improved.

In the various embodiments described herein, commands from the host computer 200 are represented in the disc drive 100 by "command nodes." When a command is received by the disc drive 100, a command node is created that has information including references to other command node(s) for logically arranging command nodes in an order that optimizes disc drive 100 performance. Command nodes are maintained and ordered in one or more command node queues. Commands from the host 200, and hence command nodes, have associated disc locations that are to be accessed to read data from or write data to the discs 108. Ordering the command nodes in the queues is based in part on the disc locations, because the disc locations largely determine the time required to process the command nodes.

The command nodes typically include fields containing data relevant to specific commands and specific systems. For example, a command node for a disc drive, such as disc drive 100, may include fields that specify the buffer address of the information to be transferred, the transfer length of the information to be transferred, the start of the logical block address (LBA) issued or requested by the host computer 200 (FIG. 2), the start of the physical cylinder where data is to be written/read, the start of the physical head, the start of the physical sector/starting wedge where data is to be written/read, the end of the physical cylinder where data is to be written/read, the end of the physical head, the end of the physical sector/starting wedge where data is to be written/read, and/or the end of the physical cylinder where data is to be written/read. Additionally, each command node preferably includes fields for a previous link pointer and fields for a next link pointer. In one embodiment, the logical order of the command nodes is defined by the previous link and next link pointers.

The command prioritization module 232 utilizes one or more queues to prioritize the commands received from the host 200 for execution, such as command nodes corresponding to the commands, for example. Hereinafter, the prioritization of "commands" by the module 232 includes the prioritization of the command nodes corresponding to the commands received from the host 200. The module 232 prioritizes one of the commands for execution by the microprocessor 216, which then performs the corresponding read or write operation to complete a command execution routine.

Figure 3:
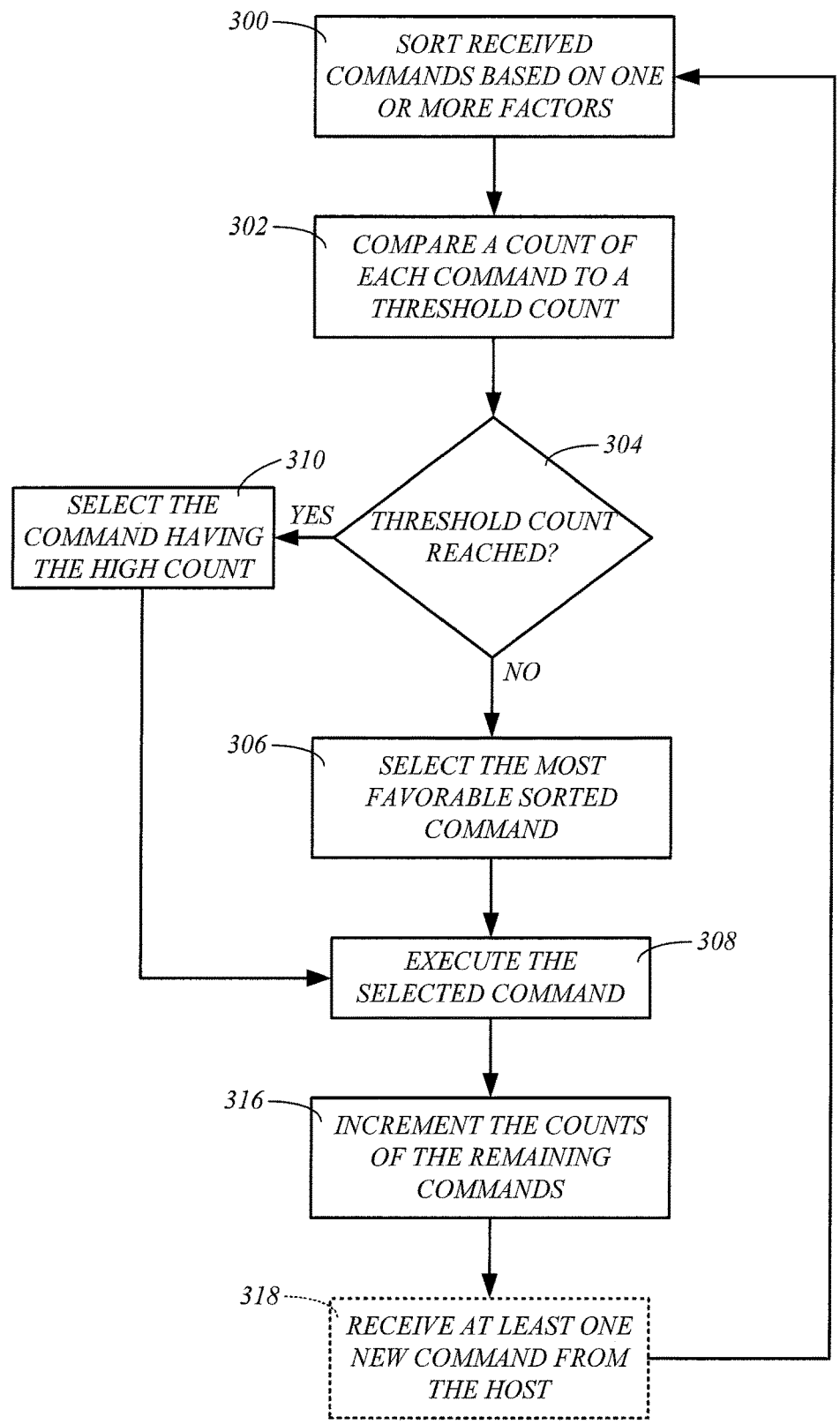
FIG. 3 is a flowchart illustrating an exemplary method of prioritizing commands for execution, in accordance with embodiments of the present disclosure.

FIG. 3 is a flowchart illustrating a method, implemented by the command prioritization module 232, of prioritizing the commands received from the host 200 for execution in accordance with embodiments of the present disclosure. In some embodiments, the method operates to balance throughput (e.g., command execution efficiency) with latency or the duration at which a command remains unexecuted. As discussed below, this may be achieved by initially sorting the commands based on one or more factors, such as an estimated access time, and selecting the most favorable command for execution, unless another, less favorable command, has sat unexecuted for at least a threshold number of command execution routines.

FIGS. 4A and 4B illustrate an exemplary queue, generally referred to as 400, having commands (e.g., command nodes), generally referred to as 402, corresponding to commands received from the host 200 (FIG. 2) in accordance with embodiments of the present disclosure during various stages of the method.

The exemplary queue 400A shown in FIG. 4A has been populated with the commands 402, and may have previously undergone one or more sorting and command execution routines. In some embodiments, the queue 400 may be stored in the memory 224, the buffer 210, or other suitable memory of the system. While only a single queue 400 is illustrated as being used, it is understood that the module 232 may utilize multiple queues to perform the method. The one or more queues 400 implemented in the drive 100 may take on any suitable form, such as a linked list.

At 300 of the method, the module 232 analyzes the commands 402 in the queue 400A received from the host 200, and sorts each of the commands 402 based on one or more factors relating to an efficiency at which the command 402 can be executed by the microprocessor 216 to form the sorted queue 400B shown in FIG. 4B. Thus, the exemplary sorted queue 400B represents a sorted list of the commands 402 after step 300, with the most favorable (e.g., access time favorable) command 402 (command 402E) for execution being listed first, followed by the next most favorable command 402 (command 402B) for execution, and so on. Exemplary embodiments of the factors include an estimated access time, an estimated seek time, an estimated rotational latency time, an estimated time to process the command 402, and/or another factor relating to the efficiency at which the command 402 can be executed. Step 300 may occur after selecting and executing a command 402 in the queue 400A, and receiving a new command 402 from the host 200.

In some embodiments, a skip count 406 is associated with each of the commands 402. Each count 406 represents the number of execution routines that have occurred while the corresponding command 402 was available for selection and execution within the queue 400. In the exemplary sorted queue 400B, the command 402E was available for selection and execution a total of 4 times, the command 402B was available for selection and execution 12 times, and so on. Thus, the count 406 represents the number of times selection and execution of the corresponding command 402 was skipped in favor of another command 402. Accordingly, the greater the count 406 for a given command, the greater the latency of the command 402.

Embodiments of the method place a limit on the latency of the commands 402 by overriding the selection of the most favorable command (e.g., command 402E) for execution with the command 402 having a count 406 that reaches (e.g., meets or exceeds) a threshold count 408, which may be stored in the memory 224 (FIG. 2), for example. Thus, at 302 of the method, the counts 406 of the commands 402 are compared to the threshold count 408. At 304, if none of the counts 406 of the sorted commands 402 reaches the threshold count 408, the module 232 selects the most favorable command 402 for execution at 306, and the selected command is executed at 308 by performing the corresponding read or write operation using the microprocessor 216. If, at 304, one of the counts 406 of the sorted commands 402 reaches the threshold count 408, the module 232 selects the command 402 for execution over the most favorable command 402 at 310, and the selected command is executed at 308 by performing the corresponding read or write operation using the microprocessor 216.

For example, in the queue 400B, the count 402E was determined to be the most favorable command in step 300. The module 232 then compares (304) the counts 406 of the remaining commands 402 to the threshold count 408 to determine if any of the counts 406 reaches the threshold count 408. If, for example, the threshold count 408 is set to 30, which is higher than any of the counts 406 of the commands 402 in the queue 400B, then the module 232 selects (306) the most favorable command 402E for processing, and the command 402E is then executed (308), as indicated by arrow 412.

If, however, the threshold count 408 is set to 20, then step 304 would reveal that command 402H has a count 406 that has reached the threshold count 408. As a result, the command 402H is selected (310) for execution over the most favorable command 402E, and is executed (308) as indicated by arrow 414 using the microprocessor 216.

Accordingly, a prolonged latency before executing the exemplary command 402E is avoided by the method implemented using the command prioritization module 232. Additionally, the method overcomes deficiencies described above with regard to aging (time) limits, such as operating the drive 100 in a first-in-first-out manner following a prolonged delay in executing a command.

The threshold count 408 may be a static number that is set, for example, at the time of manufacture and stored in the memory 224 or another location that is accessible by the command prioritization module 232. Alternatively, the threshold count 408 may be dynamically set by the microprocessor 216 based on one or more conditions or parameters, such as the number of commands 402 in the queue 400, an access pattern, or other condition or parameter, for example. The dynamically set threshold count may be determined based on a formula or using a look-up table.

In some embodiments, following the execution of the selected command at 308, the method increments the counts of the remaining commands 402 in the queue 402B, as indicated at 316. In some embodiments of the method, the queue 400 receives a new command 402 from the host 200, as indicated at 318. The method then returns to 300 to restart the process by sorting the updated queue 400.

It is understood that embodiments of the present disclosure include variations to the above-described method. For example, the method illustrated in FIG. 3 is arranged to increment (316) the counts 406 after the execution (308) of the selected command 402. However, the incrementing step (316) could also be performed prior to the execution step 308, such as prior to the comparing step 302, for example. Embodiments of the method include these and other variations.

Although the embodiments of the present disclosure have been described with reference to preferred embodiments, workers skilled in the art will recognize that changes may be made in form and detail without departing from the spirit and scope of the present disclosure.

What is claimed is:

1. An apparatus comprising:
   a buffer containing a plurality of variably-sized commands pending for a data storage medium; and
   a processor configured to:
      sort the variably-sized commands in an execution efficiency favorable manner, which reveals a most favorable command for execution;
      dynamically set a threshold count based on a number of the variably-sized commands in the buffer;
      compare a skip count for each of the variably-sized commands to the threshold count, the skip count corresponding to a number of times execution of the command has been skipped in favor of execution of another command; and
      execute one of the variably-sized commands having a skip count that has reached the threshold count over the execution of the most favorable command.

2. The apparatus according to claim 1, wherein the processor executes the command by performing a read operation or a write operation on the data storage medium in accordance with the command.

3. The apparatus according to claim 2, wherein the processor sorts the variably-sized commands in an execution efficiency manner based on at least one factor selected from the group consisting of an estimated access time, an estimated seek time, an estimated rotational latency time, and an estimated time to process the command.

4. The apparatus according to claim 3, wherein the processor is configured to increment the skip count for each of the variably-sized commands remaining in the queue.

5. The apparatus according to claim 4, wherein the processor is configured to store a new command in the queue after executing the command.

6. The apparatus according to claim 5, wherein the processor is configured to:
   sort the variably-sized commands in the queue based on an efficiency at which the commands can be executed, which reveals a most favorable command for execution;
   compare the skip count for each of the variably-sized commands to the threshold count;
   select a command having a skip count that has reached the threshold count; and
   select the most favorable command when the skip counts have not reached the threshold count; and
   execute the selected command.

7. A method comprising:
   storing variably-sized commands for a data storage medium in a queue using a processor;
   sorting the variably-sized commands based on an efficiency at which the commands can be executed, which reveals a most favorable command for execution, using the processor;
   setting a threshold count based on a number of the variably-sized commands in the queue using the processor;
   comparing a skip count for each of the variably-sized commands to the threshold count, the skip count corresponding to a number of times execution of the command has been skipped in favor of execution of another command, using the processor; and
   executing one of the variably-sized commands having a skip count that has reached the threshold count over the execution of the most favorable command, using the processor.

8. The method according to claim 7, wherein executing one of the variably-sized commands comprises performing a read operation or a write operation on the data storage medium using the processor.

9. The method according to claim 8, wherein sorting the variably-sized commands comprises sorting the variably-sized commands based on at least one factor selected from the group consisting of an estimated access time, an estimated seek time, an estimated rotational latency time, and an estimated time to process the command.

10. The method according to claim 9, further comprising incrementing the skip count for each of the variably-sized commands remaining in the queue using the processor.

11. The method according to claim 10, further comprising storing a new command in the queue after executing one of the variably-sized commands using the processor.

12. The method according to claim 11, further comprising:
   selecting one of the pending variably-sized commands in the queue for execution using the processor comprising:
      sorting the variably-sized commands based on an efficiency at which the variably-sized commands can be executed and revealing a most favorable command for execution;
      comparing the skip count for each of the variably-sized commands to the threshold count;
      selecting a command having a skip count that has reached the threshold count; and
      selecting the most favorable command when the skip counts have not reached the threshold count; and
   executing the selected command using the processor.

13. A method comprising:
   storing variably-sized commands pending for a data storage medium in a queue using a processor;
   selecting one of the pending variably-sized commands in the queue for execution using the processor comprising:
      sorting the variably-sized commands based on an efficiency at which the commands can be executed to reveal a most favorable command for execution;

setting a threshold count based on a number of the variably-sized commands in the queue;

comparing a skip count for each of the variably-sized commands to the threshold count, the skip count corresponding to a number of times execution of the command has been skipped in favor of execution of another command;

selecting one of the variably-sized commands having a skip count that has reached the threshold count; and selecting the most favorable command when the skip counts have not reached the threshold count; and executing the selected command using the processor.

14. The method according to claim 13, wherein executing the selected command comprises performing a read operation or a write operation on the data storage medium using the processor.

15. The method according to claim 14, wherein sorting the variably-sized commands comprises sorting the variably-sized commands based on at least one factor selected from the group consisting of an estimated access time, an estimated seek time, an estimated rotational latency time, and an estimated time to process the command.

16. The method according to claim 15, further comprising incrementing the skip count for each of the variably-sized commands remaining in the queue using the processor.

17. The method according to claim 16, further comprising storing a new command in the queue after executing one of the variably-sized commands using the processor.

* * * * *